J. S. BOYUM.
RANGE FINDER.
APPLICATION FILED OCT. 28, 1910. RENEWED MAY 23, 1912.
1,032,874.
Patented July 16, 1912.
7 SHEETS—SHEET 2.
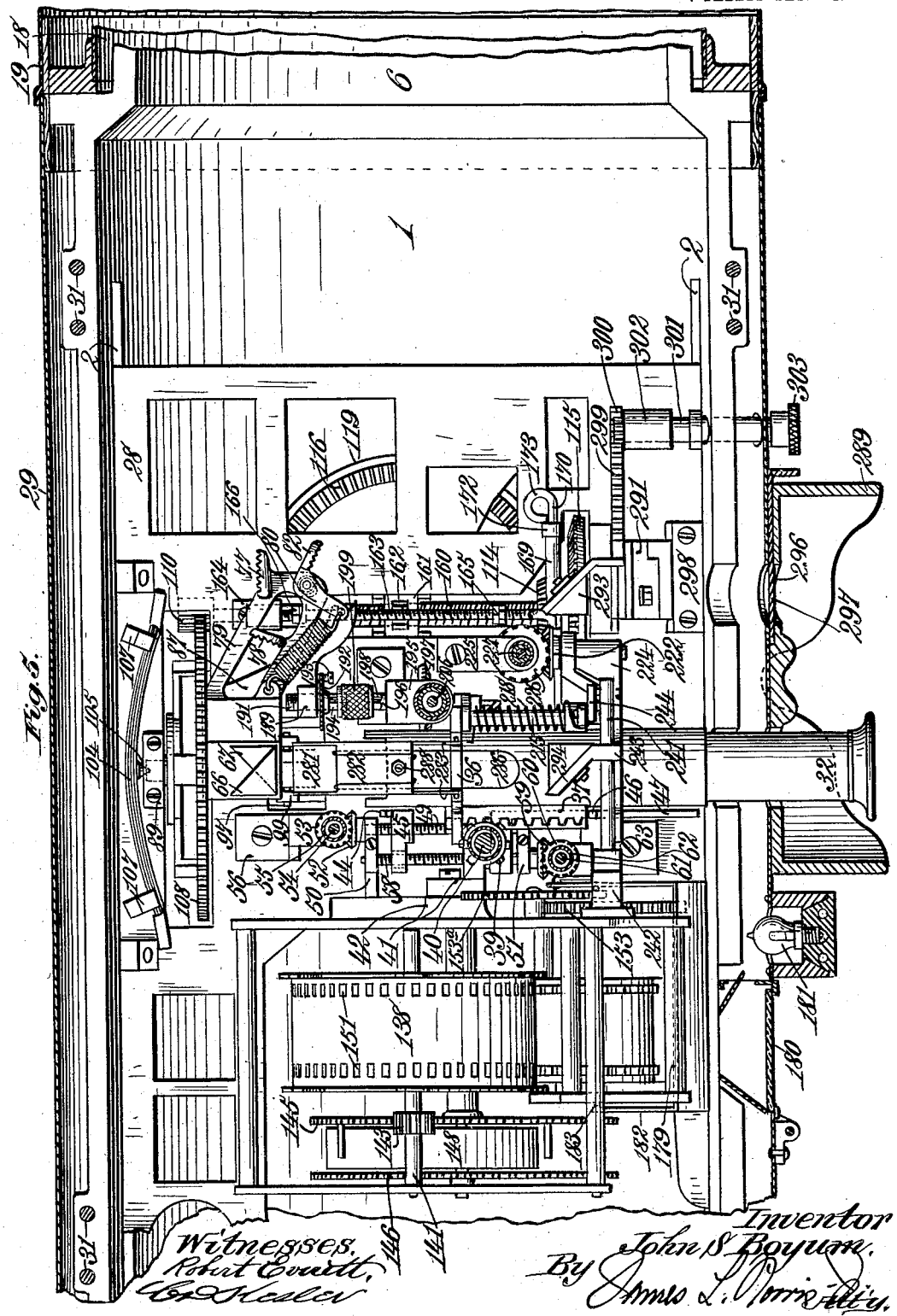

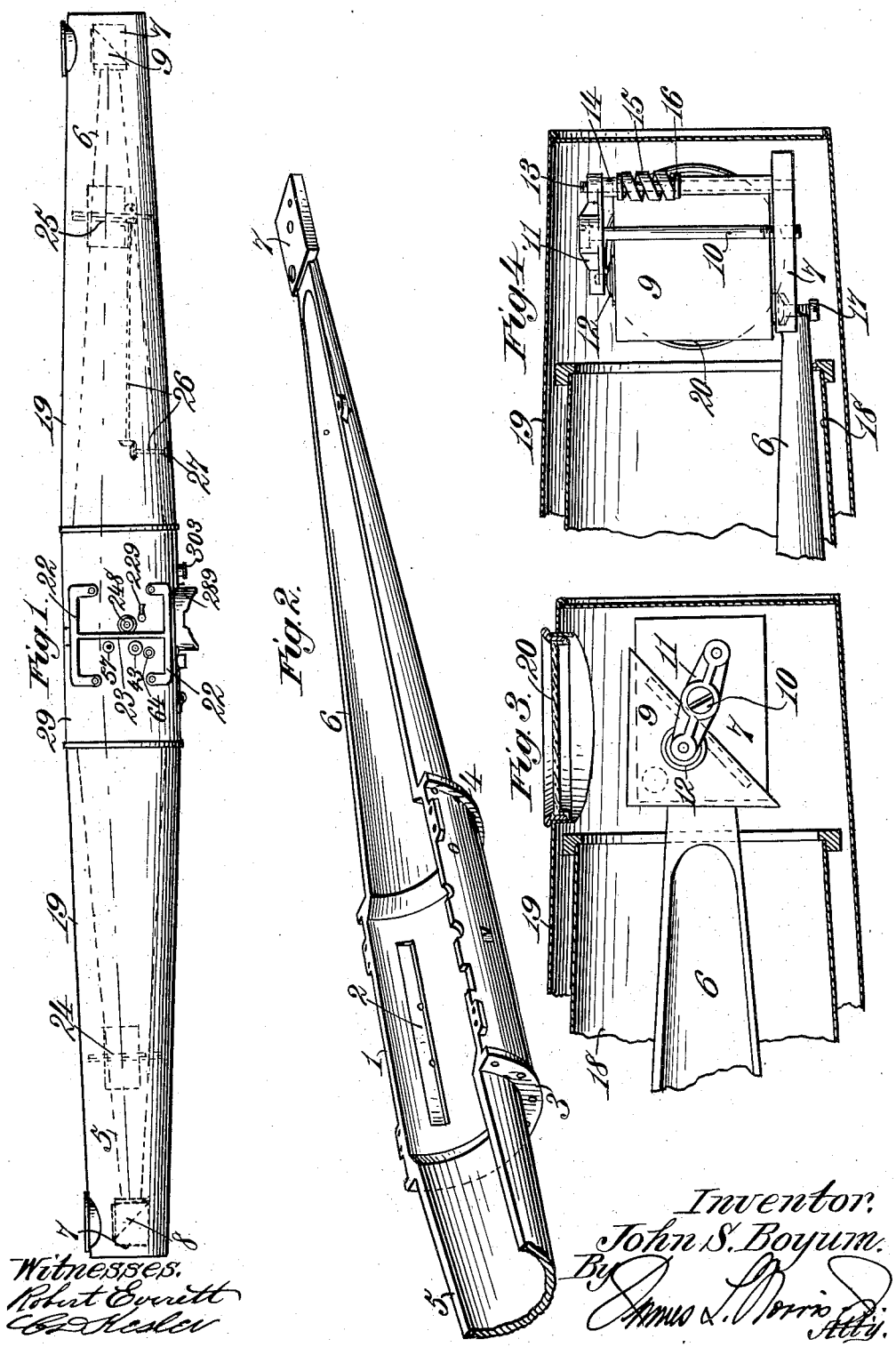

J. S. BOYUM.
RANGE FINDER.
APPLICATION FILED OCT. 28, 1910. RENEWED MAY 23, 1912.
1,032,874.
Patented July 16, 1912.
7 SHEETS—SHEET 3.
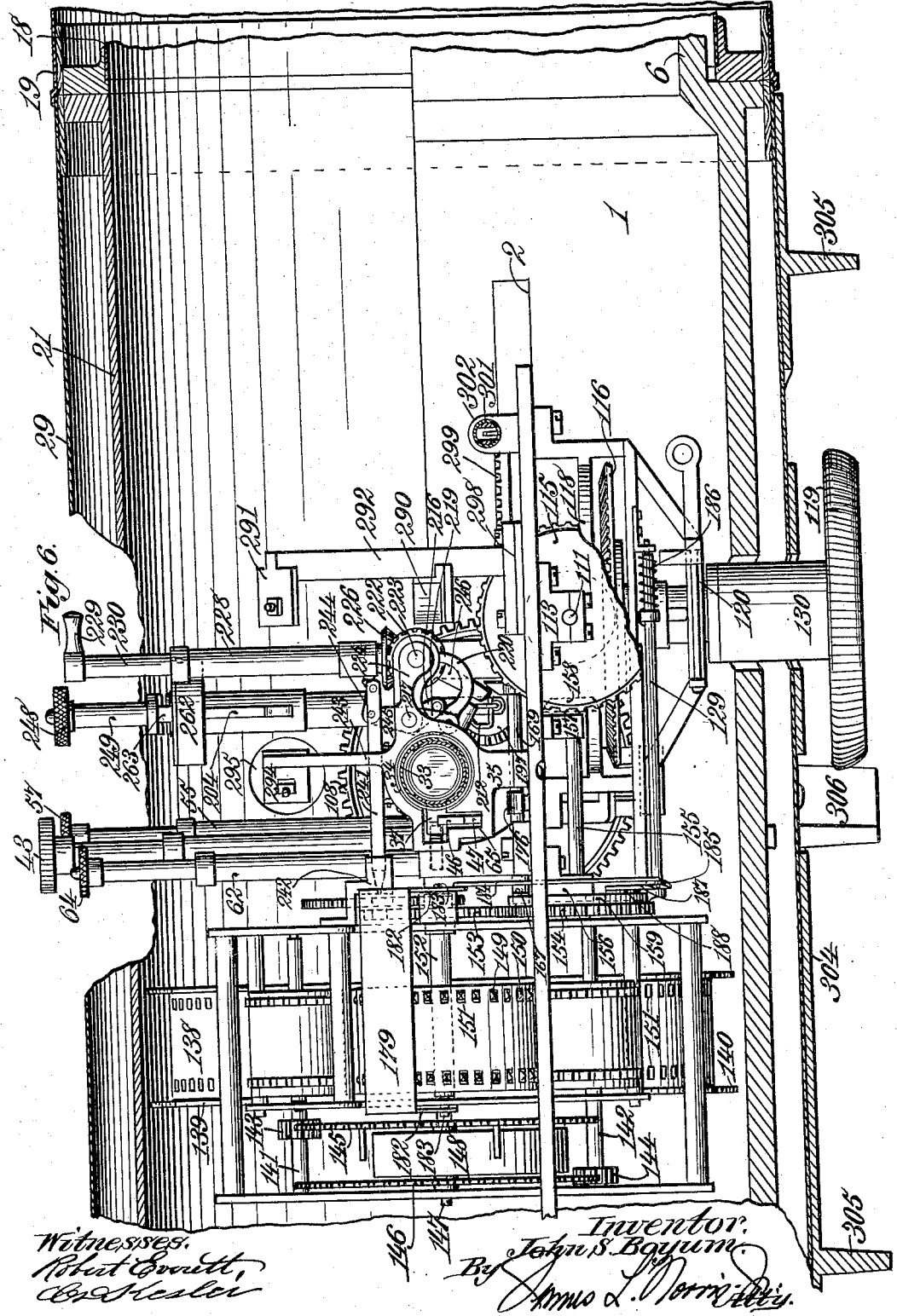

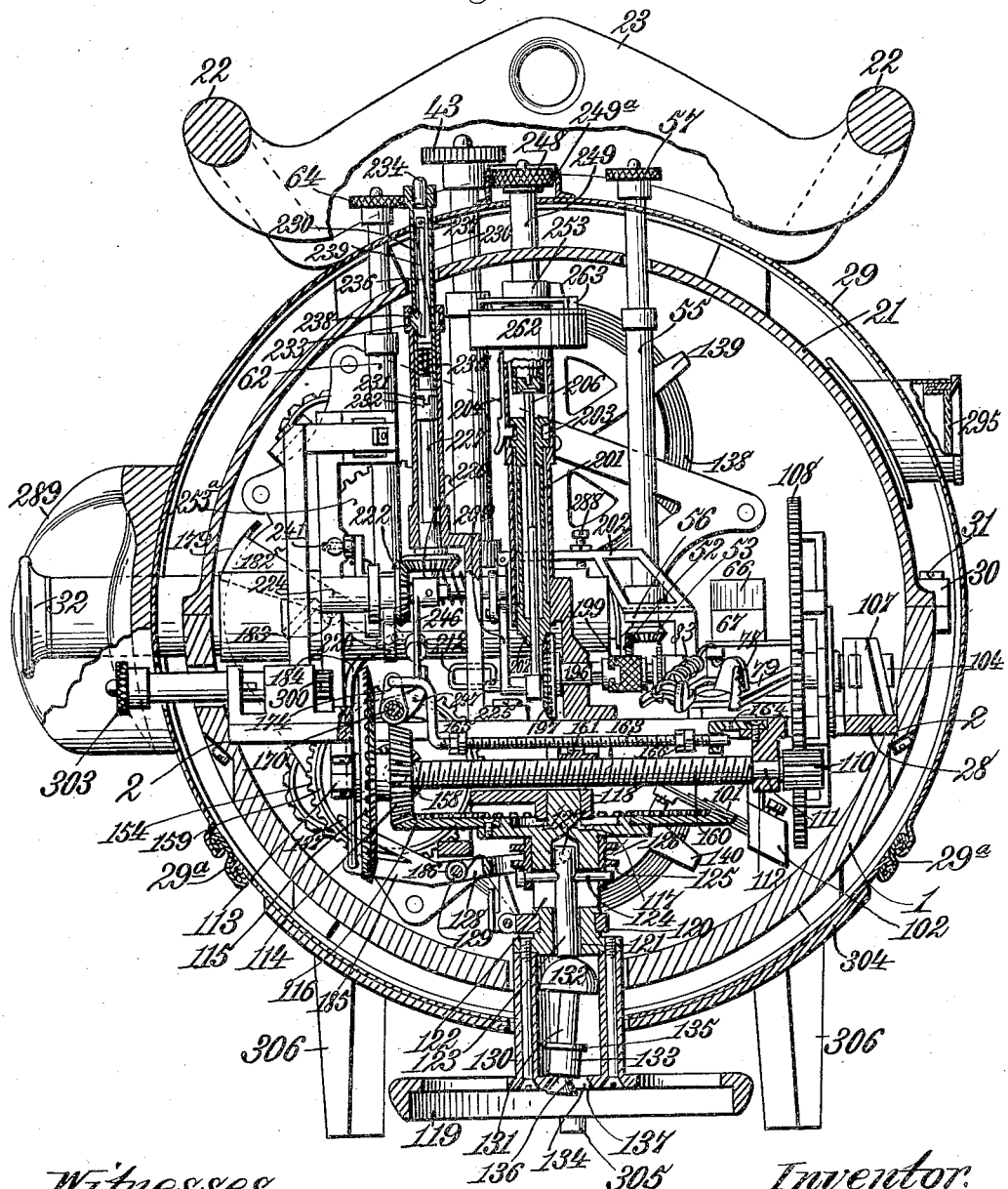

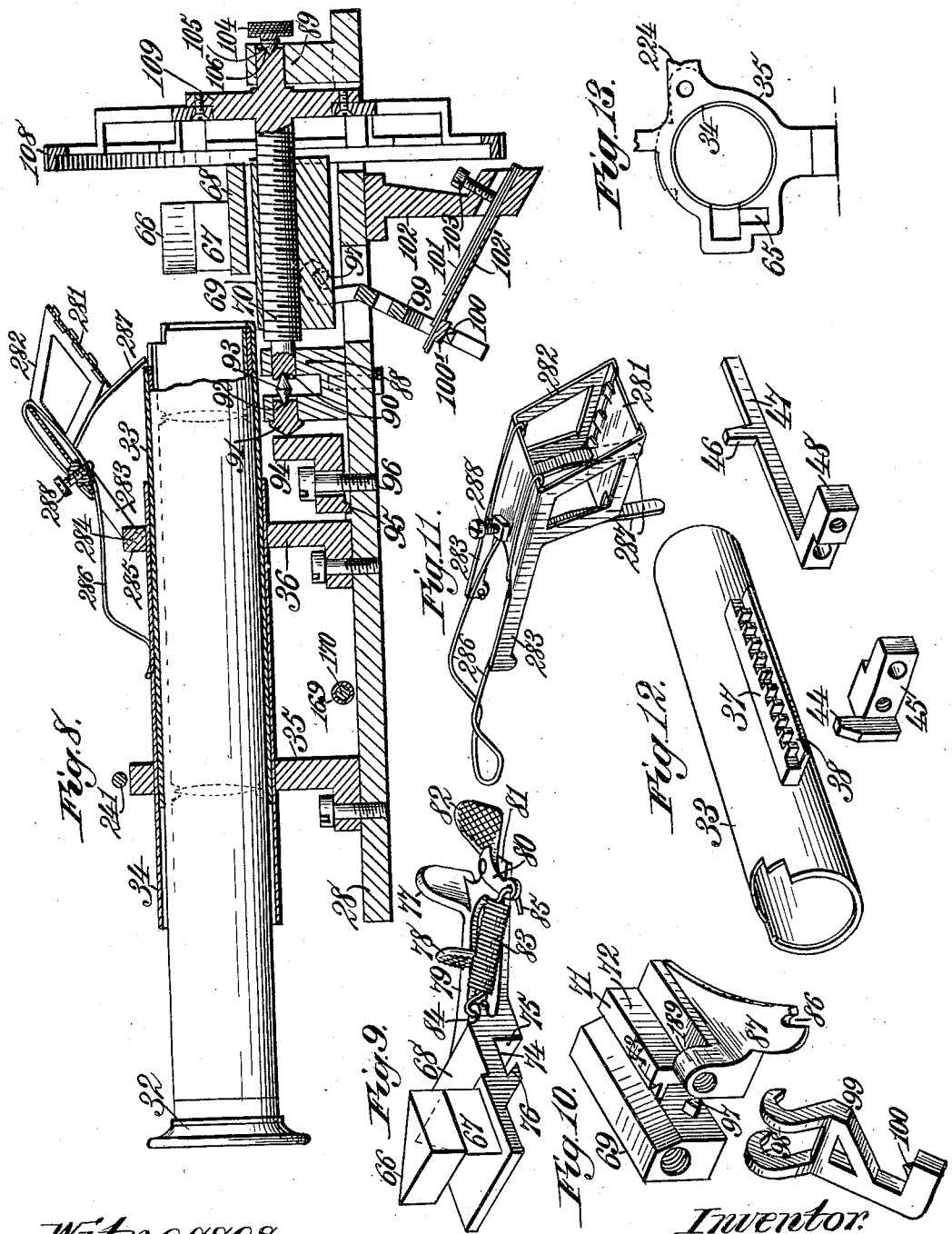

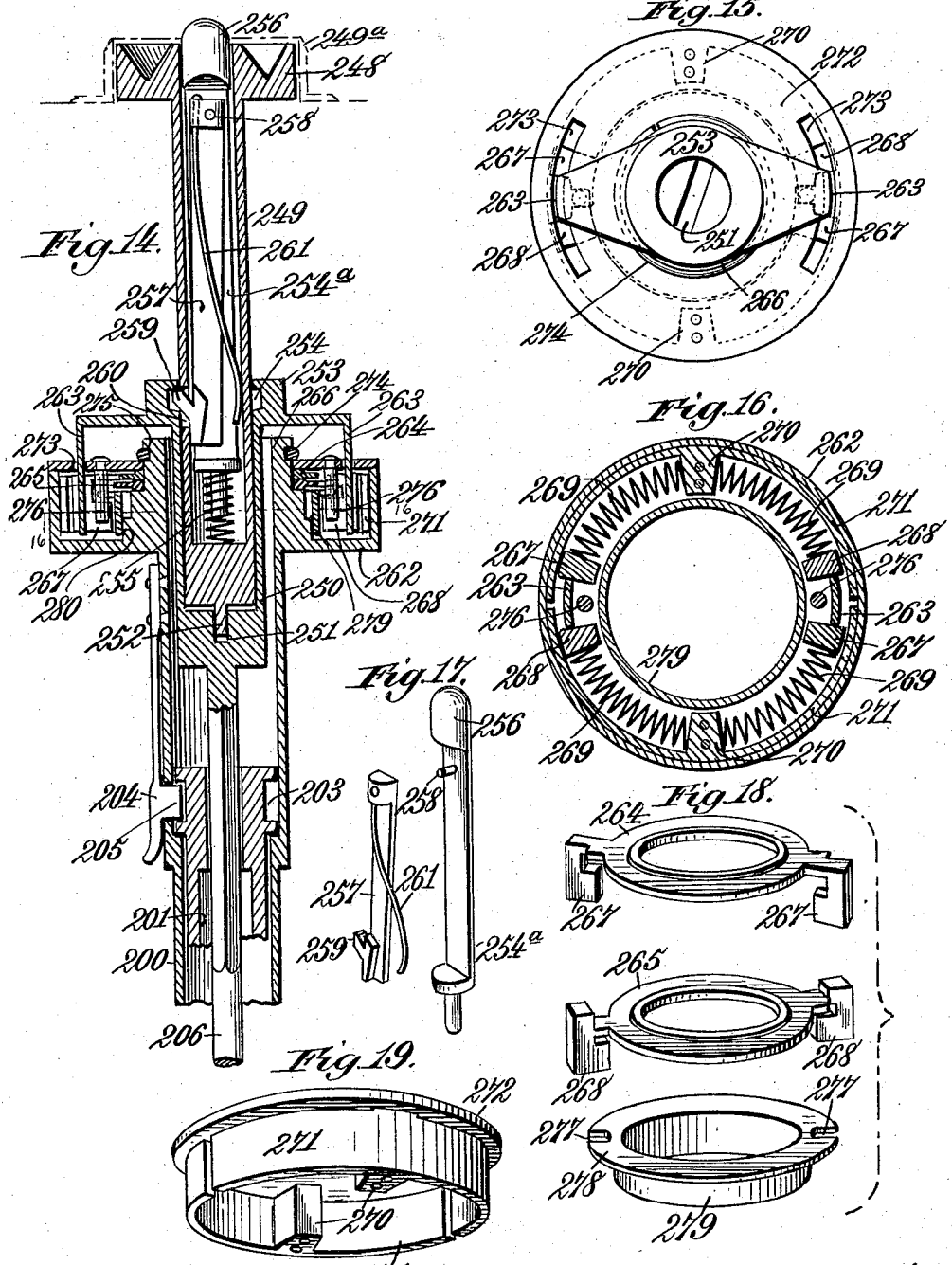

J. S. BOYUM.
RANGE FINDER.
APPLICATION FILED OCT. 28, 1910. RENEWED MAY 23, 1912.
1,032,874.
Patented July 16, 1912.
7 SHEETS—SHEET 7.
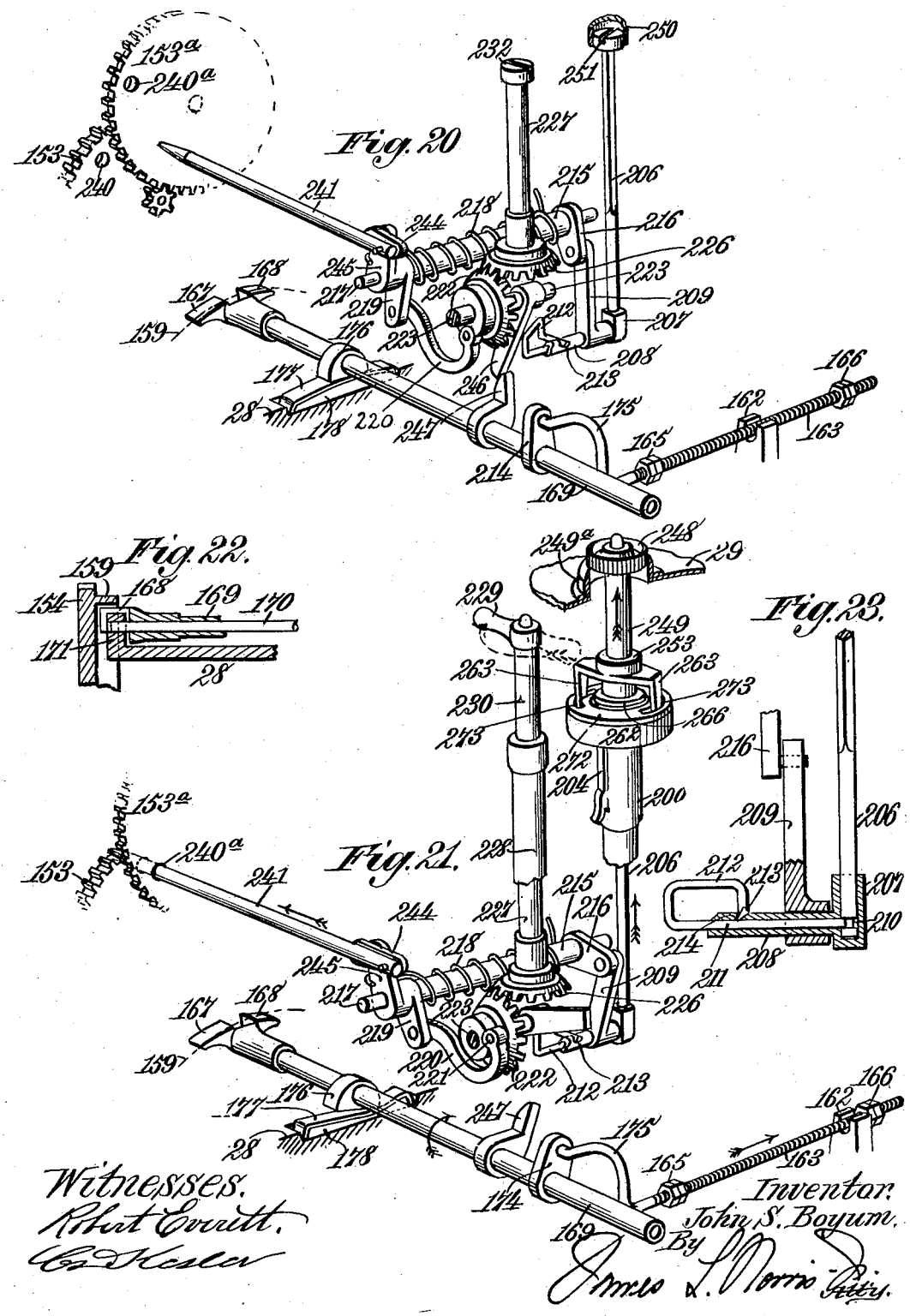

UNITED STATES PATENT OFFICE.

JOHN S. BOYUM, OF NASHVILLE, TENNESSEE.

RANGE-FINDER.

1,032,874. Specification of Letters Patent. Patented July 16, 1912.

Application filed October 28, 1910, Serial No. 589,509. Renewed May 23, 1912. Serial No. 699,280.

*To all whom it may concern:*

Be it known that I, JOHN S. BOYUM, a citizen of the United States, residing at Nashville, in the county of Davidson and State of Tennessee, have invented new and useful Improvements in Range-Finders, of which the following is a specification.

My present invention relates to improvements in range finders whereby distances between a given point and different objects may be determined, and the invention consists in certain improvements in an instrument of this character whereby the errors occurring in the ultimate results of finding ranges are reduced to a minimum.

In the accompanying drawing, I have shown the range finder constructed in accordance with my invention. It is to be understood that the invention is not necessarily limited to the exact construction shown in the drawing, as the drawing illustrates but one embodiment of the invention and constructions equivalent to those shown in the drawing will be included within the terms of the claims annexed to the specification.

In the accompanying drawings:—Figure 1 represents a top plan view of a range finder constructed in accordance with one embodiment of the invention, the same being viewed from the exterior; Fig. 2 is a detail perspective view of a portion of the casting which serves to firmly support and rigidly maintain the optical parts and the range-finding mechanism in proper relation; Figs. 3 and 4 are sectional views of one end of the range finder showing in top plan view and elevation respectively the mounting for one of the primary reflectors; Fig. 5 is a top plan view of the range-finding mechanism, the inclosing casing being shown in section; Fig. 6 is an elevation of the range-finding mechanism as viewed from the bottom in Fig. 5, the inclosing casing in this view being also broken away; Fig. 7 represents a vertical section through the range-finding mechanism, and also its inclosing casing; Fig. 8 is a detail sectional view taken axially of the range-finding eye-piece and the screw and carriages constituting part of the range-finding mechanism, the eye-piece being focused for range-finding, and the shield for separating the parts of the image during standardization of the instrument with a target being shown in inoperative position; Fig. 9 is a detail perspective view of the carriage and the secondary reflectors which are attached to such carriage; Fig. 10 is a detail perspective view of the carriage which coöperates with the range-finding screw and detachably receives the carriage supporting the secondary reflectors, this view also showing the take-up device for preventing backlash between the range-finding screw and its carriage; Fig. 11 is a detail perspective view of the shield detached from the eye-piece support, this shield serving when the eye-piece support is focused for the target to divide or separate the two parts of the image; Fig. 12 is a detail perspective view of the adjustable section of the eye-piece carrier, this view also showing the front and rear stops for positioning the eye-piece both for target and range-finding adjustments; Fig. 13 is a detail view of the rear eye-piece support; Fig. 14 represents an axial section of the shaft for standardizing the instrument at infinity adjustment and also the device for regulating the back-lash between the infinity and range-finding adjustments; Fig. 15 represents a top plan view of the parts shown in Fig. 14 with the adjusting head detached; Fig. 16 represents a transverse section of the back-lash regulating device on the line 16—16 of Fig. 14; Fig. 17 shows in perspective the parts composing the latch for detachably locking the hand-wheel or head to the coöperative parts in Fig. 14; Fig. 18 shows in perspective parts of the back-lash regulating device as shown in Fig. 16; Fig. 19 is a perspective view of part of the back-lash regulating device as viewed from the under side; Fig. 20 is a perspective view of those parts of the mechanism composing the brake for automatically arresting the movement of the traveling tape when it approaches the infinity mark in one direction and the end of the tape in the opposite direction, and also the interlock whereby operation of the infinity adjustment is prevented except when the instrument is set for the infinity adjustment, and during the infinity adjustment, the tape is locked from movement; Fig. 21 is a view similar to Fig. 20 except that the brake in this figure is shown set to arrest the movement of the tape, the infinity adjustment is set for operation, and this infinity adjustment locks the tape from movement; Fig. 22 is a detail sectional view of the brake showing it in coöperative relation with the brake flange on the tape-operating gear; and Fig. 23 is a detail sectional view of the clip for detachably locking the infinity adjustment shaft in operative position.

Similar parts are designated by the same reference characters in the several views.

In that embodiment of the invention shown in the accompanying drawing, the optical parts and the coöperative range-finding mechanism are firmly supported and rigidly maintained in proper operative relation by means of a support 1 which is preferably composed of a one-piece casting of suitable metal and of appropriate strength and rigidity. The central portion of this support is recessed at 2 to form a supporting ledge for the range-finding mechanism, and a pair of flanges 3 and 4 are provided which serve for the attachment of a suitable housing which will protect the mechanism and the support from atmospheric and thermal influences. Arms 5 and 6 proceed in opposite directions from the central portion of the support or casting, these arms being preferably trough-shaped and taper as they proceed from the center. The end of each arm is formed with a base 7 and the primary reflectors 8 and 9 are firmly mounted in fixed position upon these bases. Any suitable means may be provided for rigidly supporting these primary reflectors in position. In the present instance, a vertical screw 10 is tapped into the respective base and its head engages a rigid arm 11. One end of this arm overhangs the top of the respective reflector and bears upon a cap 12, this cap in turn pressing upon the top of the reflector and thereby causing it to rest firmly and immovably upon its base. The opposite end of the arm 11 slidably engages the top of a stationary rod 13 which is rigidly secured to the base at a point removed from the reflector, and this end of the arm coöperates with a sleeve 14 which in turn is engaged by a spring 15, this spring bearing at its lower end against a shoulder 16 on the rod 13 and serving to compensate for temperature variations to the end that a sufficient pressure is maintained at all times upon the reflector to maintain it precisely in fixed relation to its base. A screw 17 may be tapped into the under side of the base and arranged to engage the lower side of the reflector at a point adjacent to its apex in order to facilitate the proper positioning of the reflector. An inner sleeve 18 preferably of tapered form is applied over each of the arms 5 and 6 of the casting, these inner sleeves being preferably secured rigidly to the central portion of the casting by screws or other means entering the flanges 3 and 4, and an outer casing 19 also preferably of tapered form is supported by each of the inner sleeves and is rigidly secured to said sleeves. The central portion of the casting or support 1 is surrounded by a casing 29 which in order to render it removable is provided with slidable locking strips 29ª, spaces being formed between the sleeves and casings to substantially insulate the interior parts from the effects of heat. The outer casings 19 are provided toward their ends with glass-covered apertures 20 which are placed in front of the respective primary reflectors and admit light rays from an object to these primary reflectors. The central portion of the support or casting 1 is covered by a housing 21, and in order to facilitate the mounting or handling of the instrument a pair of oppositely arranged handles 22 are secured to this housing 21. These handles are preferably connected by a cross-piece or blade 23 and by placing this blade parallel with the optical axis of the instrument, it may serve as a sighting device whereby the operator may direct the instrument approximately toward the object, the range of which is to be determined. The arms 5 and 6 support lenses 24 and 25, these lenses being interposed between the respective primary reflectors and the secondary reflectors, which latter are adjustable in determining the different ranges. In the present instance, the secondary reflectors are superposed, that is to say, one is arranged above the other, and in order to properly direct the light rays reflected from the two primary reflectors upon the respective secondary reflectors, one of these lenses (the lens 25 in the present instance) is mounted for vertical adjustment and, in order to facilitate adjustment of this lens, suitable shafts 26 may be employed which are connected to each other and to the adjusting means for the lens by bevel gearing, and a milled wheel or head 27 within convenient reach of the operator serves to adjust the lens.

The range-finding mechanism is contained within the central casing 29, the mechanism being mounted upon a supporting plate 28 which rests upon and is firmly secured to the ledges 2 formed in the central portion of the casting 1. The upper portion of this range-finding mechanism is housed over by the substantially semi-circular housing 21 which is secured to the central portion of the casting 1 by the lugs 30 and screws 31. This covering or housing 21 may be removed, however, when desirable or necessary, the range-finding mechanism being then exposed for inspection or removal.

The range-finding mechanism embodies a telescope having an eye-piece 32, a front section 33, and an outer housing or casing 34. This outer section 34 is stationary and is supported upon the plate 28 by means of a pair of brackets 35 and 36. The sections 32 and 33 of the eye-piece are adjustable axially with respect to the outer stationary section 34 and the section 33 is provided on one side with a rack 37, a guard 38 projecting outwardly beneath the rack. This rack forms part of the means for adjusting the section 33 forwardly and rearwardly for the purpose of focusing the telescope for long or short ranges. To enable the rack 37 to be operated conveniently from the exterior of the instrument casing, a pinion 39 is provided which coöperates with the rack and is fixed to an adjusting shaft 40, this shaft being mounted in a bearing 41 which is attached to the plate 42 and this plate in turn is rigidly supported with respect to the plate 28, the shaft 40 having a milled head or adjusting wheel 43 which projects through openings in the member 29 and the central casing 21. I prefer to employ a pair of stops which may be suitably adjusted so that the telescope may be quickly focused, either for a short range such, for instance, as would be used in standardizing the instrument by the aid of a target, and for a long range, such as would be used in determining the range or distance of an object. In the present instance, I provide a forward stop 44 which is attached to a cross-head 45 and a rearward stop 46 which is formed as a part of an adjustable bar 47, this bar 47 being attached to a second cross-head 48. The cross-head 45 is threaded to coöperate with an adjusting screw 49, the ends of which are journaled in suitable bearings 50 and 51. This screw 49 has a bevel gear 52 on its forward end which coöperates with a bevel gear 53 attached to the lower end of an adjusting shaft 54, this adjusting shaft being journaled in a sleeve 55 which is rigidly supported by a bracket 56 secured firmly to the base 28, and the upper end of this shaft 54 is provided with a milled head or operating wheel 57 which is arranged exteriorly of the central casing 21 and within convenient reach of the operator. The cross-head 45 which coöperates with the screw 49 has a second aperture which, however, is slidable along a second screw 58, this second screw being also journaled at its ends in the bearings 50 and 51 and is threaded in the cross-head 48, this cross-head 48 being attached to the rear stop 46 and serving to adjust its position. The cross-head 48 has an aperture through which the screw 49 loosely passes and it is also fitted on its rear end with a bevel gear 59 which coöperates with a bevel gear 60 attached to an adjusting shaft 61, this adjusting shaft being journaled to revolve within a sleeve 62 which is fixed at its lower end by a bracket 63 to the supporting plate 28, and the upper end of the shaft 61 is provided with a milled head or operating wheel 64 which is also exposed at the exterior of the instrument casing and enables the operator to conveniently adjust it. These forward and rear stops 44 and 46 are in the path of the rack 37 attached to the focusing section 33 of the telescope and by suitably positioning these stops, they will coöperate with the respective ends of the rack and thereby automatically set the telescope for long and short range observations. The bar 47 which carries the rear stop 46 may be conveniently guided at its rear end by the rear supporting bracket 35 for the telescope, this bracket being provided with a recess 65 in which this bar 47 operates.

The secondary reflectors which receive the images reflected thereon by the respective primary reflectors are mounted in front of the eye-piece and in axial alinement therewith. The present invention provides improved means for mounting these secondary reflectors whereby they may be readily removed for cleaning and instantly replaced precisely in proper position, and novel means is provided for adjusting these secondary reflectors whereby the most accurate results are obtainable in determining the different ranges. In the present instance, I provide a pair of secondary reflectors 66 and 67, these reflectors being arranged in superposed relation and they are immovably secured to each other and to a detachable carriage 68. This carriage 68 I shall term a "secondary carriage" as it is mounted in turn upon a primary carriage 69. The primary carriage 69 is of a novel construction, it avoiding the use of gibs or guides which are liable to introduce errors into the ultimate results of the instrument and, according to the present invention, no back-lash can possibly occur between either the primary or secondary carriages or between these carriages and the coöperative mechanism. This primary carriage 69 is mounted on and coöperates with a finely threaded screw 70 which is revolved during the range-finding operation so as to adjust the secondary reflectors axially with respect to the eye-piece. This primary carriage 69 is provided at one side of the screw with a rib 71, one face 72 of which is vertical while its other face 73 is undercut.

The secondary carriage 68 is provided with a groove, the upper wall 74 of which fits properly upon the top flat face of the rib 71; it has a vertical wall 75 which is parallel to the flat vertical face 72 of the rib 71 on the primary carriage, and the wall 76 of this groove is beveled to fit properly against the undercut face 73 of the rib 71 on the primary carriage. The vertical wall 75 of the groove in the secondary carriage is spaced from the beveled wall 76 a distance greater than the spacing of the vertical and undercut faces 72 and 73 of the rib in order that when the vertical wall 75 of the groove in the secondary carriage is moved toward or brought into engagement with the vertical wall 72 of the rib, the beveled wall 76 will clear the undercut wall 73 of the rib and thereby permit the secondary carriage carrying the secondary reflectors to be readily detached.

To facilitate manipulation of the secondary carriage during removal and replacing, it is provided with a pair of stationary finger grips 77 and 78 which are formed upon an arm 79 which extends diagonally with respect to the rib-receiving groove in the secondary carriage. This arm 79 of the secondary carriage is also provided with a thumb lever 80 which is slidably pivoted on the arm at 81, one end of this thumb lever having a grip 82 at one end which is substantially opposed to the stationary grip 77 and the other end of the thumb lever is connected to one end of a coiled tension spring 83, the other end of this spring being attached to an eye 84 formed on the secondary carriage. That end of the spring 83 which is attached to the thumb lever 80 is formed into a hook 85 and this hook, when the finger grips 77 and 82 are relatively proximated, can be engaged in a notch 86 formed in a lug 87 which proceeds diagonally from the primary carriage 69, and when the pressure upon the thumb grip 82 is released, the tension of the spring 83 will cause the hook 85 thereon to seat itself in the notch 86 and the spring 83 will then operate as a tension medium between the two carriages which will draw the beveled wall 76 of the groove in the secondary carriage firmly against the undercut surface 73 of the rib 71 on the primary carriage, the secondary reflectors being thereby positioned precisely with respect to the primary reflectors and the eye-piece. This spring 83 performs another function which will be hereinafter described. The screw 70 which coöperates with and serves as a mounting for the primary carriage 69 is journaled at one end in a bearing 88 which is rigidly fixed to the supporting plate 28, the other end of the screw being journaled in a bearing 89 which is also rigidly fixed to the plate 28. That end of the screw which is journaled in the bearing 88 is provided with a conical depression 90 in its axial center, and a thrust-sustaining member 91 is fitted into the bearing 88 in axial alinement with the screw 70 and also has a conical depression 92 which is opposed to and is in alinement with the depression 90 in the screw. A piece of hard metal 93 in the form of a double cone is interposed between the screw 70 and the thrust-sustaining member 91, the apices resting in the conical depressions 90 and 92 respectively of these parts. This piece 93 sustains the thrust exerted upon the screw 70 with a minimum friction and, moreover, it will sustain the thrust properly, notwithstanding any lack of alinement that may develop between the screw and the thrust-sustaining member 91. The thrust-sustaining member 91 is preferably in the form of a plug fitted into the bearing 88. To retain this member in position, I prefer to employ an abutment 94 which is substantially of angle form, one arm of the abutment pressing against the head of the member 91 which is preferably coned, as shown, and the other arm of the abutment is provided toward its rear edge with a rib 95 which rests upon the top of the supporting plate 28. A clamping screw 96 passes through the abutment in advance of the rib 95 thereon and is tapped into the supporting plate 28 and when this screw 96 is tightened, it will firmly clamp the thrust-sustaining member 91 in proper position.

In order to maintain the primary and secondary carriages in proper position, to prevent these parts from turning or tilting about the screw 70 as an axis, and to eliminate any back-lash that might have a tendency to develop between the primary carriage and the screw and its thrust bearings, I provide the primary carriage 69 at opposite sides with knife-edges 97, and these knife-edges coöperate with a pair of hooks 98 formed upon a tension member 99. This tension member and the knife-edges are arranged diagonally with respect to the axis of the range-finding screw 70, this tension member 99 projecting through an opening in the supporting plate 28 and provided at its lower end with a point 100 which rests in a cup 100' fixed to a thin flexible plate 102' and receives the pressure of a spring 101, this spring, which is flexible in a single plane only, being supported by a bracket 102 which depends from the plate 28 and by the plate 102' which is fixed to the bracket 102, the spring being secured in position by a clamping screw 103. The angle through which the spring 101 exerts its force upon the primary carriage 69 corresponds approximately to the slope of the sides of the threads on the screw 70 and, owing to the angle through which the spring operates upon the primary carriage, this carriage will be constantly but yieldably drawn in a direction that will retain it in such relation to the screw 70 as to prevent any back-lash and, moreover, the screw 70 will be held in proper engagement with the thrust-sustaining piece 93. The screw 70 is also held in proper engagement with the thrust-sustaining piece 93 by means of a bow spring 104 which has a conical pin 105 attached to its intermediate portion which presses within a conical depression 106 formed in the forward end of the screw 70, and the two ends of this spring are sustained by lugs 107 formed on the plate 28.

During adjustment of the instrument to determine the ranges of different objects, the carriage 69, together with the secondary reflectors, is shifted forwardly and rearwardly by revolving motion of the screw 70. Such motion is transmitted to the screw by means of a gear wheel 108 which in the present instance is secured to a hub 109 which is formed as a part of the screw. Motion is transmitted to the gear wheel 108 on the screw by means of a pinion 110 which is fixed to a shaft 111. This shaft 111 is journaled in bearings 112 and 113 which are rigidly fixed to the under side of the supporting plate 28, and this shaft 111 is also fitted with a pair of bevel gears 114 and 115. The bevel gear 114 coöperates with a larger bevel gear 116 which is fixed to a vertical adjusting shaft 117. The upper end of this shaft 117 is reduced and is journaled in a bearing 118 attached to the supporting plate 28. The lower end of the shaft 117 has a hand-wheel 119 of suitable size fixed thereto, this hand-wheel serving as means by which the operator may adjust the instrument in determining different ranges and also in standardizing the instrument by the aid of an infinity target. The shaft 117 immediately above the hand-wheel is steadied by means of a second bearing 120 which is also rigidly secured to the supporting plate 28. The shaft 117 is provided with an axial bore 121 and also with a diametrical slot 122. A plunger 123 is freely operable axially within the bore 121 of the shaft 117 and is provided toward its upper end with a cross-pin or bar 124 which operates freely in the diametrical slot 122 in the shaft 117 and is connected at its ends to a collar 125 which is freely shiftable axially from the exterior of the shaft 117 and is provided with a circumferential groove 126. Projections 127 arranged in diametrical relation upon a fork 128 engage in the groove 126, and this fork 128 is fixed to a rock shaft 129. The hub 130 of the hand-wheel 119 is hollow and contains a plunger 131, the upper end of which is fitted with a rounded head 132 adapted to press upon the lower end of the plunger 123 and thereby elevate the latter, and the lower end of the plunger 131 is provided with a collar 133 which is adapted to pass partially through an opening 134 formed in the axial center of the hand-wheel 119. The collar 133 is prevented from passing entirely through the opening 134 in the hand-wheel by a flange 135 which is formed upon its upper end. The plunger 131, however, may be held in elevated position by shifting it laterally after it has been elevated, the lower end of the collar 133 being provided for this purpose with an undercut groove 136 which is adapted to engage the beveled edge 137 of the opening 134. By returning the lower end of the plunger 131 to the axial center of the hand-wheel 119, it will be released and may then be lowered. The plunger 131 and the connected mechanism just described are parts of the means employed for opening the cover or shutter which exposes the scale of the instrument and simultaneously sets a brake upon the mechanism so as to prevent the adjustment from changing during or before a reading is taken and, by combining the operating plunger 131 with the hand-wheel 119 which serves to adjust the instrument for the different ranges, the operator is enabled to manipulate these parts with the greatest facility.

According to the present invention, a direct reading of the different ranges is obtained from a traveling tape, this tape being graduated and provided with figures indicating directly the different ranges and it is operatively connected to the hand-wheel 119 and to the screw 70 which adjusts the secondary reflectors in determining the different ranges. The tape mechanism is not claimed in this application, but it will be described generally in order that a clear understanding may be had of the complete instrument. The tape or band 138 which is graduated or contains numerals corresponding to the different ranges is of a suitable length and its ends are attached to upper and lower reels 139 and 140. The shafts 141 and 142 respectively which revolve with these reels are provided with pinions 143 and 144. The pinion 143 coöperates with a gear wheel 145 while the pinion 144 coöperates with a gear wheel 146. These gear wheels 145 and 146 are mounted upon a common shaft 147, and a spiral spring 148 is interposed between the wheels, one end of the spring being attached to the wheel 145 while the other end of the spring is attached to the wheel 146. The action of the spring 148 is to maintain the tape taut, both reels having a tendency to wind the band or tape. While the tape is being unwound from one reel and wound upon the other, it is obvious, however, that the speed of rotation of the two reels will vary, but owing to the differential action of the gear wheels 145 and 146, together with the compensating spring 148, this variation in rate of movement of the reels will be provided for and the band or tape will be kept taut at all times. A sprocket wheel 149 is interposed between the reels and coöperates with the tape to impart movement thereto from the range-finding mechanism. In order to provide a proper driving connection between the band or tape and this sprocket wheel, the latter is provided with teeth 150 adjacent to its opposite edges which coöperate with the rows of regularly spaced apertures 151 formed adjacent to the two marginal edges of the tape. The sprocket wheel 149 is mounted upon a shaft 152 and this shaft is fitted with a driving gear 153. This driving gear 153 coöperates with a gear 154 and this gear is fixed to a shaft 155 journaled in bearings 156 and 157 secured to the under side of the supporting plate 28. The opposite end of the shaft 155 is provided with a bevel pinion 158 which coöperates with a relatively large bevel gear 115 on the shaft 111. As the sprocket wheel which drives the tape and the screw 70 which adjusts the secondary reflectors are both operatively connected in predetermined relation to the hand-wheel 119, it is obvious that the tape will be shifted in a predetermined ratio to the movement incident to the adjustment of the secondary reflectors. The gear 154 is preferably provided with a brake flange 159 whereby the tape may be held from movement while a reading is being taken from the tape. According to the present invention, I also provide means for automatically producing a braking effect upon the tape when the movement of the tape in one direction approaches the infinity mark and while the movement of the tape in the opposite direction approaches its end, the attention of the operator being thereby automatically directed to the fact that the instrument has approximately reached an adjustment where it may be standardized by the aid of an infinity target, and it also directs the attention of the operator to the fact that the traveling band or tape is approaching its end so that stripping of the band from either spool is prevented. To this end, the shaft 111 is formed as a screw 160 of suitable pitch, and this screw coöperates with a traveling crosshead 161 which is suitably guided by the under side of the supporting plate 28. This cross-head has a fork 162 which straddles a rod 163, this rod being preferably formed as a screw and one end thereof is slidably engaged in a lug 164 fixed to the supporting plate 28. Stops 165 and 166 are secured at appropriate points toward the opposite ends of the threaded rod 163, these stops in the present instance being in the form of two nuts locked together whereby they may be adjusted so as to be engaged by the fork 162 on the cross-head as the tape approaches the limit of its movement in either direction, and continued rotation of the screw 160 will cause the rod 163 to be shifted to automatically set the brake upon the brake flange 159 on the gear 154. The brake in the present instance consists of a pair of brake shoes 167 and 168 which are formed on a sleeve 169, and this sleeve is journaled on a pin 170 which in order to enable the parts to be readily taken apart and assembled is removable, one end of the pin being engaged in an apertured lug 171 formed on the supporting plate 28 while the opposite end of this pin is rotatably fitted in a bearing lug 172 which forms an abutment for the brake-operating sleeve 169. The end of the pin adjacent to the bearing lug 172 may be formed with an eye 173 which serves as a handle to facilitate removal and insertion of the pin. The brake-operating sleeve 169 has a crank 174 fixed thereto, and this crank is operatively connected to an offset arm 175 formed as a part of the rod 163.

In order to normally hold both brake shoes 167 and 168 out of engagement with the brake flange 159 on the gear 154 and thus permit the traveling band or tape to shift without resistance, a rocker 176 is fixed to the brake-operating sleeve 169 and it has a flat under side which coöperates with a flat spring 177 which spring may be conveniently inserted in a recess 178 formed in the supporting plate 28. This spring normally acts upon the flat face of the rocker 176 to hold the two brake shoes 167 and 168 in neutral position, but rotation of the sleeve 169, owing to movement of the rod 163 in either direction, will cause one of the brake shoes to act upon the brake flange 159 of the gear 154, thereby resisting further rotation of the tape and this resistance to the further movement of the tape or band will be felt by the operator while manipulating the hand-wheel 119.

Reading of the numerals upon the traveling band or tape is controlled by a shutter 179 which is so mounted as to move to and from a position in front of that portion of the band or tape engaged by the sprocket wheel, the observation of the tape being made through a suitable glass-covered sight aperture 180 formed in the inclosing casing of the instrument and to render the numerals or marks on the band readily readable, I preferably provide an electric illuminating lamp 181 which is mounted so as to direct its rays upon the band. This shutter 179 in the present instance has arms 182 which are pivoted on fixed axes 183, and one of the arms is connected by a rod 184 to a lever 185 which lever is fixed to the rock shaft 129 whereby upward movement of the plungers 123 and 131 will pull upon the rod 184 and thereby lift and open the shutter to enable a reading to be had of the traveling band or tape and, when these plungers are permitted to descend, the shutter will immediately close and cover the traveling band or tape. Gravity may serve to produce closing movement of the shutter but in the present instance, I have shown a spring 186 which surrounds the shaft 129 and also acts to produce closing movement of the shutter. Means is also provided for automatically producing a braking action upon the traveling band or tape whenever the shutter is opened or lifted in order that a change in the adjustment of the instrument cannot occur before or during a reading of the band or tape. In the present instance, the lever 185 is provided with an arm 187 which has one end offset to form a brake shoe 188, this brake shoe on the arm 187 being arranged within the brake flange 159 on the gear 154, and it will be seen that when the shutter is opened, this same movement of the parts will cause the brake shoe 188 to be set, this braking action, however, being immediately released when the shutter closes. The present invention also provides means whereby the instrument may be readily and accurately standardized by the aid of an infinity target. According to the present invention, this infinity adjustment is so related to the range-finding adjustment that when the instrument is in condition for determining ranges, the infinity adjustment is automatically locked so that it cannot be disturbed and when the instrument is in condition for standardization by the aid of an infinity target, the mechanism for determining ranges is automatically locked so that its adjustment cannot be altered. Means is also provided by the present invention for producing a suitable amount of slack or back-lash between the infinity-adjusting means and the carriages which support the secondary reflectors.

In the present instance the standardization of the instrument is effected by properly adjusting the secondary carriage 68 which carries the secondary reflectors, with respect to the primary carriage 69 which is operatively associated with the range-finding mechanism. In the present instance, the primary carriage 69 has a threaded lug 189 into which an infinity adjustment screw 191 is fitted. One end of this screw abuts against the adjacent edge of the secondary carriage 68 carrying the secondary reflectors. This infinity adjustment screw is provided with suitable means for preventing its accidental turning. In the present instance, it is held at the different adjustments by friction produced upon the screw by the lug 189 and the toothed wheel 192 which is threaded upon the screw and abuts against the lug 189 after the manner of a lock nut. A suitable stop 193 coöperates with the toothed periphery of the wheel 192 and serves to retain it in the different adjusted positions. This infinity adjustment screw 191 moves with the carriage 69 during the adjustment of the instrument in determining the different ranges, and the detachable secondary carriage 68 is held at all times in engagement with the end of the infinity adjustment screw under the tension of the spring 83, this spring acting diagonally with respect to the axis of the infinity adjustment screw.

The end of the screw 191 opposite to that engaged by the secondary carriage 68 is provided with a square or other angular-shaped portion 194 which forms part of a coupling through which this infinity adjustment screw is operatively connected with infinity adjustment mechanism which is mounted in stationary relation upon the supporting plate 28. This mechanism in the present instance embodies a bearing 195 which is fixed immovably upon the upper side of the supporting plate 28 and has a shaft 196 journaled therein, one end of this shaft carrying a bevel gear 197 by which the shaft is rotated, and the opposite end of this shaft 196 has a squared or other angular-shaped portion 198 which is complemental to the square or angular-shaped portion 194 formed on the infinity adjustment screw. Obviously, during adjustment of the instrument in determining different ranges, the infinity adjustment screw will move toward or from the shaft 196, it being in axial alinement with this shaft. I provide means, however, for maintaining operative connection between the infinity adjustment screw and this shaft 196, irrespective of the relative movements between the parts, such means consisting in the present instance of a coupling 199, the ends of which fit loosely upon the angular portions 194 and 198 so as to transmit rotation between the shaft 196 and the infinity adjustment screw, but the coupling has a sliding engagement with these angular portions on the infinity adjustment screw and the shaft which compensates for the relative approaching and receding movement between these parts.

The present invention provides means for maintaining a proper amount of slack or looseness between the coupling and the infinity adjustment screw and shaft in order to eliminate friction at this point during the adjustment of the instrument in determining the different ranges. The upper portion of the bearing 195 is formed with a stationary sleeve 200 which in the present instance is arranged vertically. A hollow shaft 201 is rotatably fitted within the sleeve 200 and is formed at its lower end with a bevel pinion 202 which coöperates with the bevel gear 197. In order to detachably hold the hollow shaft 201 in position, its upper end is formed with a circumferential groove 203, and a spring latch 204 is fixed to the exterior of the sleeve 200 and has a dog 205 which engages in the groove 203 and thereby prevents upward movement of the hollow shaft 201, although it will permit this hollow shaft to rotate. The hollow shaft 201 is operated by an inner stem 206, a portion of which is square or angular in cross-section and fits a correspondingly-shaped bore in the upper portion of this shaft 201 so that while the stem 206 may move axially with respect to the shaft 201, a driving connection is maintained between the parts. The lower end of the stem 206 extends loosely through the bottom of the hollow shaft 201 and engages in a socket 207, this socket having a journal portion 208 which fits into an elevating link 209, and in order to detachably connect the stem 206 to its socket 207, the lower end of the stem 206 is provided with a circumferential groove 210 while the journal portion 208 has a bore which receives an arm 211 of a locking clip. This locking clip has a resilient looped portion 212, the end of which is beveled to form a locking dog 213 to engage in a notch 214 formed in the journal portion 208, and when the dog 213 is engaged in this notch, the end of the arm 211 will rest in the circumferential groove 210 in the stem 206 and thereby detachably lock the latter in position. In order to remove the stem 206, it is only necessary to bend the loop 212 so as to disengage the dog 213 thereon from the notch 214 whereupon the arm 211 of this clip may be withdrawn from engagement with the groove 210 in the stem. The link 209 forms part of mechanism which places the operating means for the infinity adjustment in condition to be operated when the traveling tape or band is in proper position for standardizing of the instrument. This mechanism consists in the present instance of a rock shaft 215 having a crank 216 thereon which is pivotally connected to the upper end of the link 209 so as to lift the latter together with the stem 206 when rotated in one direction and to permit such parts to be lowered when rotated in a reverse direction. This shaft 215 in the present instance is in the form of a sleeve and it is journaled upon a pivot pin 217, the ends of which are supported in the brackets 35 and 36 for the telescope eyepiece, and a spring 218 surrounds the tubular shaft and normally acts to return the stem 206 in lowered position and to yieldably hold this stem in such position. This tubular shaft 215 is operated by a crank 219 which is fixed thereon and is pivotally connected to a link 220, this link having a pin 221 which operatively connects it to a bevel gear 222. This bevel gear is fixed to a shaft 223, the latter being suitably journaled in a bearing bracket 224.

In order that the link 220 may clear the shaft 223 and the hub of the bevel gear when the tubular shaft 215 is rocked in a direction to set the infinity-adjusting means in condition to be operated, it is bent in the manner shown in Figs. 20 and 21. When the infinity adjustment mechanism is in this condition, the pivot pin 221 which attaches the link 220 to the bevel gear 222 is preferably slightly beyond the axis of the shaft 223 in order that the spring 218 may then be inactive to return the infinity adjustment mechanism to inoperative condition. Any suitable means may be provided for operating the bevel gear 222 from the exterior of the instrument casing. In the present instance, I provide a bevel gear 226 which coöperates with the bevel gear 222 and is fixed to an operating shaft 227, the latter being mounted revolubly in a sleeve 228 which is fixed to the bearing bracket 225 and the upper end of the shaft 227 is operatively connected to a handle 229 which is exposed at the exterior of the instrument casing, as shown in Fig. 7. In order to enable this handle to be readily removed and replaced during dismantling of the instrument, it has a tubular stem 230, the lower end of which is formed with a diametrical rib 231 which detachably engages and forms a coupling with the upper slotted end 232 of the shaft 227. The tubular stem 230 has a telescopic fit into the upper end of the sleeve 228 and in order to detachably lock the handle 229 and tubular stem 230 in position the upper end of the sleeve 228 is provided with a circumferential groove 233 while the tubular stem 230 contains a plunger 234 which is shiftable axially within the stem, its upper end projecting slightly above the top of the handle 229 to form a press-button, and a spring 235 serves to normally hold the plunger in elevated position with the press-button projecting above the handle 229. A latch 236 is pivoted within the plunger 234 at 237 and has a dog 238 which extends diagonally to the axis of the plunger and projects through a diagonal opening formed in the wall of the tubular stem 230, and a spring 239 behind the latch serves to yieldingly press it into locking position. When the handle is applied, the diagonally inclined dog 238 will project through the tubular stem 230 and will engage in the circumferential groove 233 formed in the top of the sleeve 228, thereby maintaining the handle and its stem in operative relation with the shaft 227. When, however, it is desirable to detach the handle and its stem, it is only necessary to depress the plunger 234, the diagonal dog 238 on the latch 236 being thereby carried into engagement with the slot in the wall of the tubular stem 230 against the action of the spring 235 and the latch is thereby drawn within the stem 230 so as to disengage from the circumferential groove 233 in the sleeve 228, it being then possible to withdraw the stem 230 from the upper end of the sleeve 228.

In order to lock the graduated tape or band from movement while the instrument is being standardized by the aid of an infinity target or object, the gear wheel 153 which serves to operate the traveling tape or band, owing to its connection with the sprocket wheel 149, is provided with an aperture 240, a gear wheel 153$^a$ is mounted adjacent to the gear wheel 153 and coöperates with a pinion turnable therewith, this wheel 153$^a$ has an aperture 240$^a$, and a reciprocatory locking bar 241 is adapted to enter these apertures 240 and 240$^a$ only when they register and thereby lock the tape from movement only when the infinity mark on the tape is in proper position for infinity adjustment of the instrument and preparatory to such adjustment. This reciprocatory locking bar 241 operates loosely through a supporting bracket 242 at a point adjacent to the gear wheel 153 and its opposite end operates through an aperture formed in an arm 243 which proceeds upwardly from and forms part of the rear bracket 35 for the telescope eye-piece. A link 244 is pivotally connected to this locking bar 241 and it is also attached pivotally to a crank 245 which is fixed to the tubular shaft 215 so that when this shaft 215 is rotated by operation of the handle 229 to set the instrument in condition for the infinity adjustment, this locking bar 241 will enter the aperture 240 in the gear wheel 153 and will thereby lock the tape in proper position.

While the instrument is in condition for adjustment in determining the different ranges, the handle 229 and its connected parts are locked from operation. This result is accomplished in the present instance by an arm 246 which is fixed to the shaft 223 carrying the bevel gear 222 and this arm while the instrument is in condition for range-finding is locked behind a dog 247 fixed to the brake-operating shaft 169. Obviously, while the instrument is in condition for range-finding, this brake-operating shaft 169 will be in a neutral position with the brake shoes 167 and 168 in inoperative condition. When, however, the instrument is so adjusted as to bring the infinity mark upon the tape into a position to register with the sight opening, the brake 167 will operate to arrest further movement of the tape by reason of the rocking of the shaft 169 in the direction indicated by the arrow in Fig. 21. When the shaft 169 is rocked in this manner, the dog 247 is carried out of the locking position as shown in Fig. 20 and into the releasing position shown in Fig. 21, the arm 246 being then free to rotate into the position shown in Fig. 21 while the bar 241 is moving into locking position and the stem 206 is being elevated as indicated by the arrows in Fig. 21.

According to the present invention, the infinitely-adjusting means is incapable of operation while the instrument is in condition for range-finding. In the present instance this result is accomplished by providing an operating part in the form of a milled head or wheel 248 which is carried by a stem 249 operatively connected to and shiftable vertically with the stem 206, this wheel being nested within a housing in the form of a flange 249ᵃ on the top of the casing while the instrument is in condition for range-finding and when in condition for the infinity adjustment, this milled wheel is elevated above or moved out of its housing and is then accessible for manipulation owing to the lifting of the stem 206. In the present instance this stem 249 is detachably fitted into a socket 250 formed upon the upper end of the stem 206, the bottom of this socket having a slot 251 which receives and forms a driving connection with a transverse rib 252 upon the lower end of the stem 249, and the upper end of the socket 250 is provided with a hub 253 having an interior circumferential groove 254. The stem 249 contains an axially movable plunger 254ᵃ the lower end of which is acted upon by a compression spring 255 which serves to yieldingly hold the press-button 256 formed upon the upper end of this plunger above the milled wheel 249. A latch 257 is pivotally attached to the plunger at 258 and it has a dog 259 which extends diagonally with respect to the direction of movement of the plunger and projects through an opening 260 formed in the wall of the tubular stem 249 so as to engage in the internal circumferential groove 254 in the hub portion 253 of the socket 250. The latch is yieldingly held in such position by a spring 261 and when the dog is in locking position, the milled wheel 248 and the dog and its connected parts are held from detachment or displacement. To detach the milled wheel, however, it is only necessary to depress the button 256, the diagonally extending dog 259 being thereby retracted and withdrawn from the groove 254.

Means is provided for maintaining sufficient slack to prevent binding between the coupling 199 and the coöperative portions of the infinity adjustment screw 191 and the shaft 196. Such means consists in the present instance of a housing 262 which is formed as a part of the sleeve 200, the hub 253 attached to the socket 250 being provided with a pair of depending fingers 263 which enter the housing. This housing is hollow to contain suitable compensating mechanism which consists in the present instance of a pair of superposed disks 264 and 265 which are journaled to rotate about a hub portion 266 within the housing, and the disk 264 is provided with a pair of diametrically spaced lugs 267 while the disk 265 is provided with a pair of diametrically spaced lugs 268. These disks are so placed within the housing as to leave a space between the lugs 267 and 268 thereon, and the depending fingers 263 attached to the hub 253 rest in the spaces between these lugs. A set of springs 269 are interposed between the lugs 267 and 268 which are shiftable with respect to the housing 262 and a pair of lugs 270, these lugs 270 being formed as inward extensions of a flange 271 attached to a plate 272, this plate forming a cover for the housing 262 and its contained parts and having slots 273 of suitable length in which the flanges 263 may operate freely through a limited angle. This plate 272 is rotatable about the hub portion 266 and is detachably held in position by a retaining ring 274 which is sprung into an exterior circumferential groove 275 formed in a hub-like extension of the housing 262. A pair of pins 276 extend downwardly into the housing from the plate 272 and rest between the opposed lugs 267 and 268 of the disks 264 and 265. These pins also extend loosely through slots 277 formed at diametrically opposite points in the flange 278 of a ring 279, this ring being centered upon and rotatable about an annular shoulder 280 formed within the housing and serves as a retainer for the springs 269. During rotation of the fingers 263 to adjust the instrument for infinity range, the ends of these fingers will coöperate with the ends of the slots 273 in the plate 272, and the plate 272 together with the mechanism within the housing will rotate during the infinity adjustment. When such adjustment has been completed, however, the springs 269 will operate automatically to return the fingers 263 to substantially the centers of the slots 273, this involving a slight retrograde movement of the hollow shaft 201 which is operatively connected through the bevel pinion 202 and the bevel gear 197 to the shaft 196. This retrograde movement will be just sufficient to loosen any binding action that might be present between the angular portions 194 and 198 on the infinity adjustment screw 191 and the shaft 196 so that during the adjustment of the instrument for range-finding, no resistance to such adjustment will be offered by the coupling 199.

In standardizing the instrument by the aid of an infinity target, I have found in practice that it is necessary to separate the images from the two secondary reflectors 66 and 67 in order that images of suitable definition will be obtained and that an accurate adjustment of the instrument may be secured by precisely superposing the images. I have provided a device for accomplishing this result which according to the present embodiment of the invention is automatically brought into position when the eye-piece of the telescope is adjusted for the infinity target, and when the eye-piece of the telescope is adjusted for range-finding, this image-separating device will be automatically moved aside. This device consists in the present instance of a plate or septum 281 which is secured to an appropriate carrier 282, this carrier having a pair of arms 283 which are pivoted at 284 to a lug 285 which may be formed upon the top of the eye-piece supporting bracket 36. This carrier is provided with a suitable spring 286 which normally acts to move it into operative position before the eye-piece. The carrier is also provided with a pair of curved fingers 287 which are engaged by the forward end of the slidable section 33 of the eye-piece so that when this section of the eye-piece is extended forwardly or shifted toward the secondary reflectors, it will act upon the curved fingers 287 and will thereby lift the carrier into the position shown in Fig. 8 and when the section 33 of the eye-piece is moved rearwardly or in the direction away from the secondary reflectors, the carrier is permitted to move into a position between the eye-piece and the secondary reflectors. When the plate or septum 281 is in proper position, it occupies a plane in alinement with the plane upon which the secondary reflectors 66 and 67 are united, and in order to insure a proper positioning of the plate or septum 281 in this respect, a set-screw 288 may be tapped into the carrier and arranged to bear upon the top of the stationary or outer section 34 of the telescope eye-piece. This septum 281 enables two sharply separated and defined images to be obtained from the secondary reflectors 66 and 67, and it has been found that a precise and quick adjustment of the instrument is obtainable.

The rear section 32 of the telescope eye-piece extends through suitable openings in the casing of the instrument and is in a convenient position to receive the eye of the operator. This section of the eye piece is arranged toward one side of a light-excluding hood 289 which is attached to the exterior of the instrument. In some instances it may be desirable or preferable to employ a finder to serve as means for locating an object in order that the instrument may be aimed at the same. In the present instance, I provide a finder which embodies a lower reflector 290 and an upper reflector 291 both mounted in fixed relation upon a standard 292 fixed in a suitable manner upon the supporting plate 28, a third reflector 293 which is also fixed upon the upper portion of the standard 292, and another reflector 294 which is attached to the upper end of the vertical arm 243. The reflector 294 is in line to receive the rays entering the instrument through the glass-covered aperture 295 which is arranged at the front of the instrument while this reflector 294 bends the rays laterally out of alinement with the aperture 295 and the reflectors 290 and 291 bring the rays into a position to be received by the right eye of the operator while the left eye may be placed in alinement with the eye-piece of the range-finding telescope. The observation by means of the finder is had through an aperture 296 which is formed at the right hand side of the hood 289 and this aperture may be closed by a slide 297 which carries suitable plain transparent glass. In order that the distance between the range-finding telescope eye-piece and the finder may agree with the pupillary distance of the eyes of the operator, the standard 292 which supports the reflectors 290, 291 and 293 is mounted to shift in guides 298 formed upon the top of the supporting plate 28, the lower end of the standard being formed as a base which serves as a slide and it has a rack 299 attached thereto which coöperates with a pinion 300. This pinion 300 is fixed to a shaft 301 journaled in bearings 302 formed upon the top of the supporting plate 28, and such shaft projects to the exterior of the instrument casing and is provided with a milled wheel 303 or other suitable means for manipulating it.

The instrument may be mounted in any suitable cradle or stand which will afford the necessary adjustments for the entire instrument about a vertical of a horizontal axis. The under side of the instrument casing is preferably provided with a plate 304 of suitable strength, and a pair of longitudinally spaced lugs 305 project downwardly from this plate and a second pair of circumferentially spaced lugs 306 also project downwardly from the plate, these four lugs serving as legs to support the instrument when demounted, and the lugs 306 also preferably serve as means for securing the instrument from displacement with respect to the cradle or stand which supports it. To facilitate mounting and dismantling of the instrument, the milled heads or operating wheels 43, 57 and 64, as well as the milled head or operating wheels 248 and 303 and the handle 229, are preferably detachable and are provided with suitable means for removably locking them in position.

A range-finding instrument constructed in accordance with the present embodiment of my invention may be operated as follows: Preparatory to using the instrument for the purpose of determining the ranges of distant objects, it is preferable, if not essential to accurate results, that the instrument be standardized with respect to an infinity range. I prefer to use an infinity target as an aid to the operation of standardizing the instrument which supports objects which are separated a distance equal to the optical distance between the two primary reflectors of the instrument, although a star may be utilized as an object at an infinite range. To prepare the instrument for standardization at the infinity range, the hand-wheel 119 is revolved by the operator in the proper direction until the graduated tape or band is brought into a position where an infinity mark located thereon at the proper point registers with the glass-covered sight opening 180. As this infinity mark on the tape is approached, the screw 160 will carry the cross-head 161 into a position to engage and shift the top 166 on the threaded rod 163, this rod 163 being thereby shifted and it will then act upon the brake-operating shaft 169 to rock it from the neutral position shown in Fig. 20 into the position shown in Fig. 21, the brake shoe 167 being thereby caused to act upon the brake band or flange of the wheel 154 and further movement of the graduated tape will be resisted and such resistance will be felt by the operator in turning the hand-wheel 119. This automatic setting of the brake is a signal to the operator that the tape is approaching that end thereof which contains the infinity mark. When the infinity mark on the tape is in proper position, the handle 229 may be turned into the position shown in Fig. 21, the arm 246 at this time being free of the dog 247 and the locking bar 241 may enter the locking apertures in the gear wheels 153 and 153ª. When the instrument is in this condition, the rangefinding mechanism which includes the traveling tape and the range-finding screw 70, both of which are operatively connected to the hand-wheel 119, will be locked from operation. As the handle 229 is turned into the position shown in Fig. 21, the stem 206 will be elevated, causing a corresponding elevation of the stem 249 and the milled head or operating wheel 248 as indicated by the arrows in Fig. 21. Before the instrument is in condition for the infinity adjustment, this milled wheel 248 is nested within the housing or flange 249ª so that it would be impossible to disturb or alter the adjustment of the instrument by the infinity adjustment mechanism while the instrument is in condition for range-finding. When this operating wheel is exposed or elevated above its housing, however, it is then free to be rotated. Rotation of this wheel 248 operates through the connections hereinbefore described to turn the shaft 196, and such movement is transmitted through the compensating coupling 199 to the infinity adjustment screw 191. As the secondary carriage 68 to which the secondary reflectors are attached is maintained in engagement with the end of this infinity adjustment screw by the spring 83, turning of the infinity adjustment screw 191 will cause relative shifting movement between the secondary carriage 68 and the primary carriage 69. In standardizing the instrument with the aid of an infinity target, the sections 32 and 33 of the eye-piece are shifted toward the left in Fig. 8 and this will allow the septum or dividing plate 281 to move into a position that will enable the operator to observe two clearly separated and defined images, one from each of the superposed secondary reflectors. After the instrument has been standardized, a slight retrograde movement will be imparted to the shaft 196 which will produce sufficient looseness or slack between this shaft, the infinity adjustment screw and the coupling 199 as to avoid any binding or friction of these parts with the coupling that would otherwise resist the movement of the primary and secondary carriages during the adjustment of the instrument in determining the different ranges. The mechanism for producing this slack or looseness for such purpose has been hereinbefore described in detail.

After the instrument has been standardized with the aid of an infinity target, the sections 32 and 33 of the telescope eye-piece are then shifted to the right in Fig. 8 which will properly focus the instrument for range-finding distances, the carrier 282 supporting the septum 281 being thereby automatically moved into an inoperative position. In order to enable the telescope eye-piece to be instantly shifted so as to be properly focused either for the target or for range-finding distances, the milled heads 57 and 64 may be rotated so as to properly position the front and rear stops 44 and 46 and when these stops have been properly positioned, they will automatically arrest the telescope at proper points when shifted forwardly and rearwardly. Immediately upon standardizing the instrument, the handle 229 is returned to its original or normal position, as indicated by the dotted lines in Fig. 21. This will immediately return the milled head 248 into an inaccessible position within its housing 249 so that the infinity adjustment cannot be disturbed and at the same time the locking bar 241 will be disengaged from the gear wheel 153 operatively connected to the traveling tape. By turning the hand-wheel 119, the range-finding screw 70 will be revolved, thereby shifting the secondary reflectors while the images are observed by the operator through the telescope eye-piece.

When the instrument has been adjusted to conform to the range of the object, it will be found that a direct reading of the range or distance may be obtained from the traveling tape by an inspection of the numerals or figures on the tape through the sight aperture 180 the tape, as previously described, being operatively connected to the range-finding screw 70. As the tape is shifted from the infinity point, the rod 163 will be permitted to return to its normal position, the brake-operating shaft 169 being then returned to its neutral position by the spring 177 and there is no braking effect upon the tape during the adjustment of the instrument in determining the ranges. Should the hand-wheel 119 be revolved sufficiently to cause the other end of the tape to approach the sight opening, then the traveling cross-head or carriage 161 would engage the stop 165 and shift it so as to rock the shaft 169 into a position to bring the brake shoe 168 into action, the resistance thus offered to the further movement of the tape notifying the operator that the tape is approaching its end and thereby preventing the tape from being stripped from its spool or reel.

I claim as my invention:—

1. In a range finder, the combination of range-finding mechanism, a traveling indicating tape graduated according to the different ranges and operatively associated with the range-finding mechanism, and a brake operative automatically to resist movement of the tape when it approaches a predetermined point in its movement.

2. In a range finder, the combination of range-finding mechanism, a traveling indicating tape graduated according to the different ranges and operatively connected to the range-finding mechanism, and a brake operative automatically by the range-finding mechanism for arresting the movement of the tape when it approaches a predetermined point in its movement.

3. In a range finder, the combination of range-finding mechanism, a traveling indicating tape graduated according to the different ranges and operatively connected to move according to the different adjustments of the range-finding mechanism, spools to which the ends of said tape are attached, and a brake operative automatically to resist further movement of the tape before it has been completely unwound from one of said spools.

4. In a range finder, the combination of range-finding mechanism, a traveling indicating tape graduated according to the different ranges and operatively connected to the range-finding mechanism, a pair of spools to which the ends of said tape are attached, and a double-acting brake operative automatically to arrest further movement of the tape prior to the complete unwinding of the tape from either spool.

5. In a range finder, the combination of range-finding mechanism, a traveling indicating tape graduated according to the different ranges and also provided toward one end with an infinity adjustment mark, said tape being operatively connected to the range-finding mechanism, and a brake operative automatically to resist the movement of the tape when the infinity adjustment mark thereon reaches an operative position.

6. In a range finder, the combination of range-finding mechanism including a screw, a traveling tape graduated according to the different ranges and operatively connected to the range-finding mechanism, a double-acting brake operatively associated with the traveling tape, an actuating rod connected to the brake and having a pair of stops, and a cross-head actuated by said screw and coöperative automatically with either of said stops to resist further movement of said tape when it reaches predetermined limits in its movement in either direction.

7. In a range finder, the combination of a range-finding screw, a carriage adjustable thereby, indicating means operatively connected to the range-finding screw, a secondary carriage movable relatively to the carriage first mentioned and carrying optical parts of the range-finding mechanism, and an infinity adjustment screw fitted to one of the carriages and coöperative with the other carriage for effecting and maintaining different relative adjustments between the carriages.

8. In a range finder, the combination of a range-finding screw and indicating means operatively connected thereto, a primary carriage coöperative with said screw, a secondary carriage mounted on and shiftable axially with respect to the primary carriage and having optical parts of the range-finding mechanism attached thereto, an infinity adjustment screw fitted to one of the carriages and coöperative with the other carriage for effecting and maintaining different relative adjustments between them, and operating means for the infinity adjustment screw having a device for maintaining operative connection with the infinity adjustment screw irrespective of the shifting movements of the carriages in determining different ranges.

9. In a range finder, the combination of a range-finding screw, a primary carriage coöperative therewith, a secondary carriage mounted on and shiftable axially with respect to the primary carriage, primary and secondary reflectors, the secondary reflectors being attached to the secondary carriage, an infinity adjustment screw fitted to one of the carriages and coöperative with the other carriage for effecting and maintaining different relative adjustments between the carriages, operating means for the infinity adjustment screw, a coupling between the operating means and the infinity adjustment screw for maintaining a connection between the parts irrespective of relative shifting movements between them in determining different ranges, and means for producing slack between said coupling and the infinity adjustment screw after each adjustment of the latter.

10. In a range finder, the combination of a range-finding screw, a primary carriage coöperative therewith, primary and secondary reflectors, a secondary carriage mounted on and shiftable axially with respect to the primary carriage and having the secondary reflectors fixed thereon, an infinity adjustment screw carried by one of the carriages and coöperative with the other carriage for effecting and maintaining different relative adjustments between the carriages, operating means for turning the infinity adjustment screw in both directions, a coupling for maintaining operative connection between said operating means and the infinity adjustment screw irrespective of relative shifting movements between the parts, and means for automatically producing slack between the infinity adjustment screw and the coupling after said operating means has been turned in either direction.

11. In a range finder, the combination of primary and secondary reflectors, a range-finding screw, a primary carriage coöperative therewith, and a secondary carriage detachably mounted on the primary carriage and having the secondary reflectors fixed thereto.

12. In a range finder, range-finding mechanism including a range-finding screw, a primary carriage coöperative therewith, a secondary carriage detachably mounted on the primary carriage and having secondary reflectors fixed thereto, and means for retaining the secondary carriage in proper operative relation with the primary carriage.

13. In a range finder, range-finding mechanism including a range-finding screw, a primary carriage coöperative therewith, a secondary carriage having a detachable connection with the primary carriage and also having reflectors fixed thereto, and a spring adapted to act upon the carriages to retain them in proper operative relation.

14. In a range finder, range-finding mechanism including a range-finding screw, a primary carriage coöperative therewith, a secondary carriage having means for detachably mounting it upon the primary carriage and supporting reflectors in fixed relation thereto, a spring attached at one end to the secondary carriage and having a hook at its opposite end, and a lever slidably pivoted on the secondary carriage and connected to the hooked end of the spring whereby the hook portion of the spring may be engaged and disengaged with respect to the primary carriage.

15. In a range finder, range-finding mechanism including a range-finding screw, a primary carriage coöperative therewith, a secondary carriage having reflectors mounted in fixed relation thereon, a rib on one of the carriages extending axially with respect to the range-finding screw and forming a detachable connection with the other carriage, an infinity adjustment screw fitted to one of the carriages and coöperative with the other carriage, and a spring acting in a diagonal direction with respect to the axes of said screws and serving to retain the carriages in connected relation to one another and with respect to the infinity adjustment screw.

16. In a range finder, range-finding mechanism including a range-finding screw, a carriage threaded upon the screw and forming reflector supporting means, a spring, and means connecting the spring and said carriage and acting upon the carriage at such an angle as to eliminate back-lash between the carriage and the screw.

17. In a range finder, range-finding mechanism including a range-finding screw, a carriage coöperative with and supported solely by said screw, and means coöperative with the carriage to prevent turning thereof.

18. In a range finder, range-finding mechanism including a screw, a carriage coöperative with and supported solely by said screw, said carriage serving as reflector supporting means, a tension member connected to the carriage and acting thereon at an acute angle relatively to the axis of the screw, and a spring for producing a tension upon said member.

19. In a range finder, range-finding mechanism including a screw, a reflector supporting carriage coöperative with and supported solely by said screw, a tension member having bearings on said carriage at opposite sides of the axis of said screw, and a spring acting upon the tension member to exert a force on said carriage at an acute angle to the screw.

20. In a range finder, range-finding mechanism including a screw, a reflector supporting carriage coöperative with and supported solely by said screw, said carriage having knife edges arranged at opposite sides of the axis of said screw, a tension member arranged at an acute angle with respect to the axis of said screw and coöperative with the knife edges on said carriage, and a spring flexible in a single plane only and acting upon said tension member to move it substantially in the direction of its length.

21. In a range finder, range-finding mechanism including reflectors, a carriage for supporting and adjusting said reflectors, a range-finding screw coöperative with said carriage, a thrust member supported in axial alinement with one end of the screw, said thrust member and the adjacent end of the screw having central depressions, a thrust-piece in the form of a double cone interposed between the thrust member and the screw and having its apices engaging in the depressions of such parts, and a spring acting upon the opposite end of the screw to maintain the latter, the thrust-piece and the thrust member in operative relation.

22. In a range finder, the combination of primary and secondary reflectors, range-finding mechanism for shifting the secondary reflectors, a telescope eye-piece mounted in alinement with the secondary reflectors and having an axially shiftable section, and a pair of adjustable stops for automatically positioning the adjustable section of the eye-piece for two different focuses.

23. In a range finder, the combination of primary and secondary reflectors, means for adjusting the secondary reflectors, a telescope eye-piece mounted in coöperative relation with the secondary reflectors and embodying an axially shiftable section, a pair of screws mounted in parallel relation at one side of the telescope eye-piece, a pair of cross-heads mounted on and connected to the respective screws, each cross-head having a stop to coöperative with a part on the adjustable section of the eye-piece whereby the movement of the latter in either direction will be limited, and means for adjusting said screws.

24. In a range finder, the combination of primary reflectors, a pair of superposed secondary reflectors coöperative with the respective primary reflectors, range-finding means associated with the secondary reflectors, a telescope eye-piece coöperative with the secondary reflectors, and a septum adapted to be positioned between the eye-piece and secondary reflectors and in alinement with the plane which divides the secondary reflectors.

25. In a range finder, the combination of primary reflectors, a pair of superposed secondary reflectors, range-finding mechanism associated with the secondary reflectors, a telescope eye-piece coöperative with the secondary reflectors and having a section which is adjustable for long and short range observations, and a septum having means for automatically positioning it in alinement with the plane which divides the secondary reflectors when the adjustable section of the telescope eye-piece is set for short range observations.

26. In a range finder, the combination of primary reflectors, a pair of superposed secondary reflectors coöperative with the respective primary reflectors, range-finding mechanism operatively associated with the secondary reflectors, a telescope eye-piece mounted in alinement with the secondary reflectors and having an axially adjustable section for focusing the eye-piece for long and short range observations, and a carrier mounted in coöperative relation with the telescope eye-piece and having a septum adapted to occupy a position in alinement with the plane which divides the secondary reflectors, said carrier also having means coöperative with the adjustable section of the telescope whereby said septum will be moved into an inoperative position when the telescope eye-piece is adjusted for long range observations and will move into operative position when the telescope eye-piece is adjusted for short range observations.

27. In a range finder, the combination of range-finding mechanism, mechanism for standardizing the instrument, infinity adjustment mechanism, and means for preventing operation of the infinity adjustment mechanism when the instrument is in condition for range-finding adjustments.

28. In a range finder, the combination of range-finding mechanism, mechanism for standardizing the instrument, infinity adjustment mechanism, means for preventing operation of the infinity adjustment mechanism when the instrument is in condition for range-finding adjustments, and means for preventing operation of the range-finding mechanism when the instrument is in condition for standardization by the infinity adjustment mechanism.

29. In a range finder, the combination of range-finding mechanism, infinity adjustment mechanism, and means for locking the range-finding mechanism from operation and for setting the infinity adjustment mechanism in condition for operation.

30. In a range finder, the combination of range-finding mechanism, infinity adjustment mechanism including an operating part provided with a housing into which said operating part is nested when in inoperative condition, and means controlled by the range-finding mechanism for exposing said operating part exteriorly of said housing whereby the infinity adjustment mechanism may be operated.

31. In a range finder, the combination of range-finding mechanism including a traveling tape graduated according to the different ranges and containing an infinity adjustment mark, infinity adjustment mechanism for standardizing the instrument, and means for locking said traveling tape from movement only when the infinity adjustment mark thereon is in proper position.

32. In a range finder, the combination of range-finding mechanism, infinity adjustment mechanism for standardizing the instrument, and means capable of locking the range-finding mechanism from operation and to release and permit operation of the infinity adjustment mechanism only when the range-finding mechanism is set at infinity range.

In testimony whereof I have hereunto set my hand in presence of two subscribing witnesses.

JOHN S. BOYUM.

Witnesses:
JAMES L. NORRIS, Jr.,
CHAS. S. HYER.

---

Copies of this patent may be obtained for five cents each, by addressing the "Commissioner of Patents, Washington, D. C."